(12) United States Patent
Nakatani

(10) Patent No.: US 9,745,454 B2
(45) Date of Patent: Aug. 29, 2017

(54) TIRE

(71) Applicant: SUMITOMO RUBBER INDUSTRIES, LTD., Kobe-shi, Hyogo (JP)

(72) Inventor: Masako Nakatani, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/837,588

(22) Filed: Aug. 27, 2015

(65) Prior Publication Data

US 2016/0090475 A1 Mar. 31, 2016

(30) Foreign Application Priority Data

Sep. 25, 2014 (JP) .................. 2014-195563

(51) Int. Cl.
| | |
|---|---|
| *C08L 9/06* | (2006.01) |
| *B60C 1/00* | (2006.01) |
| *C08C 19/25* | (2006.01) |
| *C08K 3/36* | (2006.01) |
| *C08K 5/548* | (2006.01) |
| *B60C 11/00* | (2006.01) |

(52) U.S. Cl.
CPC *C08L 9/06* (2013.01); *B60C 1/00* (2013.01); *B60C 1/0016* (2013.04); *C08C 19/25* (2013.01); *C08K 3/36* (2013.01); *C08K 5/548* (2013.01); *B60C 2011/0016* (2013.04); *B60C 2011/0025* (2013.04); *C08L 2205/02* (2013.01); *C08L 2205/025* (2013.01); *C08L 2205/03* (2013.01); *C08L 2205/035* (2013.01); *Y02T 10/862* (2013.01)

(58) Field of Classification Search
CPC . C08L 9/06; C08C 19/00; C08C 19/25; B60C 1/00; B60C 1/0016; C08K 3/36; C08K 5/548
USPC ........................................ 524/526
See application file for complete search history.

(56) References Cited

U.S. PATENT DOCUMENTS

| | | | |
|---|---|---|---|
| 7,968,633 B2 * | 6/2011 | York ................ | B60C 1/0016 524/261 |
| 2012/0077902 A1 * | 3/2012 | Steiner .............. | B60C 1/0016 523/157 |

FOREIGN PATENT DOCUMENTS

JP 2005-213353 A 8/2005

* cited by examiner

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

Tire having improved wet grip performance and improved resistance to breaking or chipping along with good fuel economy. The tire includes a tire component (preferably, a tire tread) formed of a vulcanized rubber composition. The vulcanized rubber composition is obtained by vulcanizing a specific unvulcanized rubber composition. The unvulcanized rubber composition comprises (a) a rubber component composed of natural rubber, polybutadiene rubber, and two different types of styrene-butadiene rubber, (b) a filler that includes silica, and (c) a silane coupling agent that incorporates a —C(=O)—S— moiety.

6 Claims, No Drawings

TIRE

TECHNICAL FIELD

The present invention relates to a tire including a tire component formed of a specific vulcanized rubber composition.

BACKGROUND ART

Conventional rubber compositions for automobile tires include those containing a conjugated diene polymer such as polybutadiene or butadiene-styrene copolymer and filler such as carbon black or silica.

Recent growing concern for environmental issues has increased the demand for automobiles with improved fuel economy. Thus, there is another need for rubber compositions for automobile tires that give excellent fuel economy.

One way that has been employed to improve fuel economy is to reduce the filler content. However, the rubber compositions prepared in this way have lower hardness and lower breaking properties, and also tend to have reduced wet grip performance.

Meanwhile, a typical way that has been employed to improve wet grip performance is to increase the filler content. Since wet grip performance has a trade-off relationship with fuel economy, it has been difficult to achieve a balanced improvement of these properties.

A number of attempts to improve wet grip performance have also been disclosed in which a special filler such as aluminum hydroxide is used with a common filler such as carbon black or silica (see Patent Literature 1, for example). However, such a method unfortunately deteriorates abrasion resistance and has room for improvement in the balance between wet grip performance and abrasion resistance.

Thus, the development of a technique for ensuring fuel economy while simultaneously maintaining wet grip performance and breaking properties has been desired.

CITATION LIST

Patent Literature

Patent Literature 1: JP 2005-213353 A

SUMMARY OF INVENTION

Technical Problem

An object of the present invention is to solve the above problems and to provide a tire which has improved wet grip performance and improved breaking properties while ensuring fuel economy.

Solution to Problem

The present invention relates to a tire, including a tire component formed of a vulcanized rubber composition, the vulcanized rubber composition being obtained by vulcanizing an unvulcanized rubber composition, the unvulcanized rubber composition containing a rubber component, at least one filler including silica, and a silane coupling agent represented by Formula (1) below, the rubber component including natural rubber, a first styrene-butadiene rubber that has a styrene content of 35% by mass or more, a second styrene-butadiene rubber that has a styrene content of 30% by mass or less, and polybutadiene rubber, an amount of the natural rubber based on 100% by mass of the rubber component being 5 to 30% by mass, an amount of the first styrene-butadiene rubber based on 100% by mass of the rubber component being 20 to 60% by mass, an amount of the second styrene-butadiene rubber based on 100% by mass of the rubber component being 10 to 30% by mass, an amount of the polybutadiene rubber based on 100% by mass of the rubber component being 5 to 30% by mass, a combined amount of the first styrene-butadiene rubber and the second styrene-butadiene rubber based on 100% by mass of the rubber component being 30 to 80% by mass, an amount of the filler per 100 parts by mass of the rubber component being 60 parts by mass or more, an amount of the silane coupling agent per 100 parts by mass of the silica being 0.5 to 20 parts by mass,

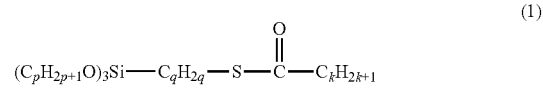

wherein p is an integer of 1 to 3, q is an integer of 1 to 5, and k is an integer of 5 to 12.

Preferably, the filler includes at least 55 parts by mass of silica per 100 parts by mass of the rubber component.

Preferably, the polybutadiene rubber is a modified polybutadiene rubber containing a functional group that interacts with silica.

Preferably, the vulcanized rubber composition has vulcanized rubber properties including: a tan δ at 0° C. of 0.50 or greater and a tan δ at 70° C. of 0.10 or smaller, as determined by viscoelastic measurement at an initial strain of 10% and a dynamic strain of 2%; and a ratio (EB/TB) of elongation at break (EB) to tensile strength at break (TB) at 30° C. of 15 or greater, as determined in accordance with JIS K 6251.

Preferably, the vulcanized rubber composition has vulcanized rubber properties including a ratio (EB/TB) of elongation at break (EB) to tensile strength at break (TB) at 80° C. of 30 or greater, as determined in accordance with JIS K 6251.

Preferably, the tire component is a tread.

Advantageous Effects of Invention

The tire according to the present invention, which includes a tire component formed of a vulcanized rubber composition obtained by vulcanizing a specific unvulcanized rubber composition, has good wet grip performance and good breaking properties while ensuring fuel economy.

DESCRIPTION OF EMBODIMENTS

The tire of the present invention includes a tire component formed of a vulcanized rubber composition obtained by vulcanizing a specific unvulcanized rubber composition which will be described below.

The unvulcanized rubber composition of the present invention contains a rubber component, at least one filler including silica, and a silane coupling agent represented by the following Formula (1):

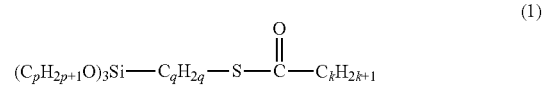

wherein p is an integer of 1 to 3, q is an integer of 1 to 5, and k is an integer of 5 to 12.

The amount of the filler is 60 parts by mass or more per 100 parts by mass of the rubber component. The amount of the silane coupling agent is 0.5 to 20 parts by mass per 100 parts by mass of silica.

Moreover, the rubber component includes natural rubber, a first styrene-butadiene rubber that has a styrene content of 35% by mass or more, a second styrene-butadiene rubber that has a styrene content of 30% by mass or less, and polybutadiene rubber. The amount of the natural rubber based on 100% by mass of the rubber component is 5 to 30% by mass. The amount of the first styrene-butadiene rubber based on 100% by mass of the rubber component is 20 to 60% by mass. The amount of the second styrene-butadiene rubber based on 100% by mass of the rubber component is 10 to 30% by mass. The amount of the polybutadiene rubber based on 100% by mass of the rubber component is 5 to 30% by mass. The combined amount of the first styrene-butadiene rubber and the second styrene-butadiene rubber based on 100% by mass of the rubber component is 30 to 80% by mass. Such an unvulcanized rubber composition can be vulcanized to give a vulcanized rubber composition which can be used in a tire component to provide a tire having improved wet grip performance and improved breaking properties while ensuring fuel economy. Thus, despite the trade-off relation between fuel economy, wet grip performance, and breaking properties, wet grip performance and breaking properties can be improved while ensuring fuel economy. This effect is a synergistic effect achieved only by combining the specific rubber component, the filler including silica, and the silane coupling agent represented by Formula (1) in specific amounts.

The natural rubber may be any natural rubber typically used in the tire industry, such as SIR20, TSR20, or RSS#3.

The amount of the natural rubber based on 100% by mass of the rubber component is 5 to 30% by mass. When the amount of the natural rubber falls within this range, excellent rubber strength can be obtained. The amount of the natural rubber is preferably 10% by mass or more, and more preferably 15% by mass or more, while preferably 25% by mass or less, and more preferably 20% by mass or less.

The first styrene-butadiene rubber may be any styrene-butadiene rubber that has a styrene content of 35% by mass or more. The styrene content in the first styrene-butadiene rubber is preferably 40% by mass or more, while preferably 70% by mass or less, more preferably 60% by mass or less, and still more preferably 50% by mass or less.

The second styrene-butadiene rubber may be any styrene-butadiene rubber that has a styrene content of 30% by mass or less. The styrene content in the second styrene-butadiene rubber is preferably 28% by mass or less, while preferably 5% by mass or more, more preferably 10% by mass or more, still more preferably 20% by mass or more, and particularly preferably 25% by mass or more.

Such a combination of the first styrene-butadiene rubber with a styrene content of 35% by mass or more and the second styrene-butadiene rubber with a styrene content of 30% by mass or less as styrene-butadiene rubber enables a balanced improvement of fuel economy and wet grip performance.

The first styrene-butadiene rubber preferably has a vinyl content of 10 mol % or more, more preferably 20 mol % or more, and still more preferably 30 mol % or more. The vinyl content is also preferably 60 mol % or less, and more preferably 50 mol % or less. When the vinyl content falls within the range mentioned above, the effect of the present invention can be sufficiently achieved.

Moreover, the first styrene-butadiene rubber preferably has a weight average molecular weight (Mw) of 700,000 or more, more preferably 800,000 or more, and still more preferably 900,000 or more, while the upper limit of the Mw is not limited to particular values, but is preferably 1,500,000 or less, and more preferably 1,300,000 or less. When the Mw falls within the range mentioned above, the effect of the present invention can be sufficiently achieved.

The second styrene-butadiene rubber, on the other hand, preferably has a vinyl content of 20 mol % or more, more preferably 30 mol % or more, and still more preferably 40 mol % or more. The vinyl content is also preferably 80 mol % or less, and more preferably 70 mol % or less. When the vinyl content falls within the range mentioned above, the effect of the present invention can be sufficiently achieved.

Moreover, the second styrene-butadiene rubber preferably has a weight average molecular weight (Mw) of 500,000 or more, more preferably 600,000 or more, and still more preferably 700,000 or more, while the upper limit of the Mw is not limited to particular values, but is preferably 1,000,000 or less, and more preferably 900,000 or less. When the Mw falls within the range mentioned above, the effect of the present invention can be sufficiently achieved.

The first and second styrene-butadiene rubbers can be prepared by known methods, such as by emulsion polymerization, solution polymerization, or anion polymerization of material monomers, such as styrene and 1,3-butadiene, in appropriately set amounts.

In these styrene-butadiene rubbers, the backbone and/or chain end may be modified with a modifier. For example, these styrene-butadiene rubbers may be modified with a multifunctional modifier such as tin tetrachloride or silicon tetrachloride to form a partially branched structure. Particularly preferably, the backbone and/or chain end, more preferably the chain end, of the first styrene-butadiene rubber and/or the second styrene-butadiene rubber, more preferably the first styrene-butadiene rubber and the second styrene-butadiene rubber, are/is modified with a modifier containing a functional group that interacts with silica. The modified styrene-butadiene rubber(s) that has been modified with such a modifier to contain a functional group that interacts with silica can be used to achieve a further balanced improvement of fuel economy and wet grip performance.

Examples of the functional group that interacts with silica include an amino group, an amido group, an alkoxysilyl group, an isocyanate group, an imino group, an imidazole group, an urea group, an ether group, a carbonyl group, an oxycarbonyl group, a sulfide group, a disulfide group, a sulfonyl group, a sulfinyl group, a thiocarbonyl group, an ammonium group, an imido group, a hydrazo group, an azo group, a diazo group, a carboxy group, a nitrile group, a pyridyl group, an alkoxy group, a hydrocarbon group, a hydroxy group, an oxy group, and an epoxy group. These functional groups may be substituted. Among these groups, primary, secondary and tertiary amino (especially glycidylamino), epoxy, hydroxy, alkoxy (preferably C1-C6 alkoxy), alkoxysilyl (preferably C1-C6 alkoxysilyl), and hydrocarbon groups are preferred because they are highly effective to improve fuel economy and wet grip performance.

The modified styrene-butadiene rubber containing a functional group that interacts with silica is preferably a styrene-butadiene rubber (S-modified SBR) modified with a compound (modifier) represented by the following Formula (2):

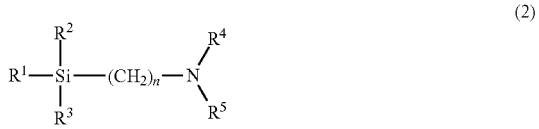

(2)

wherein $R^1$, $R^2$, and $R^3$ are the same as or different from each other and individually represent an alkyl group, an alkoxy group, a silyloxy group, an acetal group, a carboxy group (—COOH), a mercapto group (—SH), or a derivative thereof; $R^4$ and $R^5$ are the same as or different from each other and individually represent a hydrogen atom or an alkyl group, and $R^4$ and $R^5$ may be joined together to form a ring structure with the nitrogen atom; and n represents an integer.

The S-modified SBR may suitably be a styrene-butadiene rubber (S-modified S-SBR (modified SBR as disclosed in JP 2010-111753 A, which is herein incorporated by reference in its entirety)) obtained by modifying the polymerizing end (active end) of solution-polymerized styrene-butadiene rubber (S-SBR) with a compound represented by Formula (2) above.

For excellent fuel economy and excellent breaking properties, $R^1$, $R^2$, and $R^3$ in Formula (2) are each suitably an alkoxy group, and preferably a C1-C8, more preferably C1-C4 alkoxy group. $R^4$ and $R^5$ are each suitably an alkyl group, and preferably a C1-C3 alkyl group. The value of n is preferably 1 to 5, more preferably 2 to 4, and still more preferably 3. If $R^4$ and $R^5$ are joined together to form a ring structure with the nitrogen atom, the ring structure is preferably a 4- to 8-membered ring. The term "alkoxy" includes cycloalkoxy groups (e.g. cyclohexyloxy) and aryloxy groups (e.g. phenoxy, benzyloxy). When the preferred compounds are used, the effect of the present invention can be well achieved.

Specific examples of the compound represented by Formula (2) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Among these compounds, 3-dimethylaminopropyltrimethoxysilane, 3-dimethylaminopropyltriethoxysilane, and 3-diethylaminopropyltrimethoxysilane are preferred because they can well improve the above-mentioned properties. These compounds may be used alone or in combinations of two or more.

In another preferred embodiment, the modified styrene-butadiene rubber containing a functional group that interacts with silica is a styrene-butadiene rubber modified with a compound (modifier) represented by the following Formula (3):

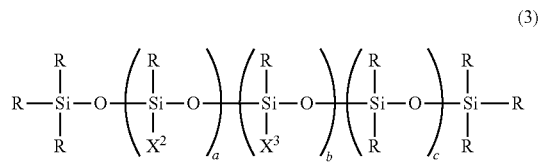

(3)

wherein Rs are the same as or different from each other and individually represent a C1-C30 monovalent hydrocarbon group; $X^2$ is a group represented by the following formula:

—$R^{11}$—O—$R^{12}$—$R^{13}$ wherein $R^{11}$ and $R^{12}$ are the same as or different from each other and individually represent a divalent hydrocarbon group, and $R^{13}$ represents a cyclic ether group; $X^3$ is a group represented by the following formula:

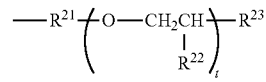

wherein $R^{21}$ represents a C2-C10 alkylene group or an alkylarylene group; $R^{22}$ represents a hydrogen atom or a methyl group; $R^{23}$ represents a C1-C10 alkoxy group or an aryloxy group; and t represents an integer of 2 to 20; and a, b, and c represent the number of repetitions of the respective repeating units and may each be 0.

The styrene-butadiene rubber modified with a compound (modifier) represented by Formula (3) may suitably be a styrene-butadiene rubber obtained by modifying the polymerizing end (active end) of solution-polymerized styrene-butadiene rubber (S-SBR) with a compound represented by Formula (3) above.

In Formula (3), Rs are the same as or different from each other and individually represent a C1-C30 monovalent hydrocarbon group which may be linear, branched, or cyclic. Examples include C1-30 aliphatic hydrocarbon groups, C3-30 alicyclic hydrocarbon groups, and C6-C30 aromatic hydrocarbon groups. Among these groups, C1-C30 aliphatic hydrocarbon groups are preferred because they lead to excellent fuel economy and excellent breaking properties. C1-C20 aliphatic hydrocarbon groups are more preferred, C1-C10 aliphatic hydrocarbon groups are still more preferred, and C1-C3 aliphatic hydrocarbon groups are particularly preferred. Preferred examples of Rs include alkyl groups with such numbers of carbons and specifically include a methyl group, an ethyl group, an n-propyl group, an isopropyl group, an n-butyl group, an isobutyl group, a sec-butyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, and an octadecyl group. Among these groups, a methyl group is particularly preferred because it provides excellent fuel economy and excellent breaking properties.

$R^{11}$ and $R^{12}$ in $X^2$ in Formula (3) are the same as or different from each other and individually represent a divalent hydrocarbon group. Examples include branched or unbranched C1-C30 alkylene groups, branched or unbranched C2-C30 alkenylene groups, branched or unbranched C2-C30 alkynylene groups, and C6-C30 arylene groups. Among these groups, branched or unbranched C1-C30 alkylene groups are preferred. Branched or unbranched. C1-C15 alkylene groups are more preferred, branched or unbranched C1-C5 alkylene groups are still more preferred, and unbranched C1-C3 alkylene groups are particularly preferred. Preferred examples of $R^{11}$ and $R^{12}$ include alkylene groups with such numbers of carbons and specifically include a methylene group, an ethylene group, a propylene group, an isopropylene group, a butylene group, an isobutylene group, a pentylene group, a hexylene group, a heptylene group, octylene group, a nonylene group, a decylene group, an undecylene group, a dodecylene group, a tridecylene group, a tetradecylene group, a pentadecylene group, a hexadecylene group, a heptadecylene group, and an octadecylene group. Among these groups, a methylene group, an ethylene group, and a propylene group are particularly preferred because they provide excellent fuel economy and excellent breaking properties.

$R^{13}$ in $X^2$ in Formula (3) represents a cyclic ether group. Examples of the cyclic ether group include cyclic ether groups having one ether bond such as an oxirane group, an oxetane group, an oxolane group, an oxane group, an oxepane group, an oxocane group, an oxonane group, an oxecane group, an oxete group, and an oxole group, cyclic ether groups having two ether bonds such as a dioxolane group, a dioxane group, a dioxepane group, and a dioxecane group, and cyclic ether groups having three ether bonds such as a trioxane group. Among these groups, C2-C7 cyclic ether groups having one ether bond are preferred, C2-C5 cyclic ether groups having one ether bond are more preferred, and an oxirane group is particularly preferred. The cyclic ether group preferably has no unsaturated bond in the ring skeleton. Moreover, the hydrogen atoms in the cyclic ether group may be replaced by any of the above-described monovalent hydrocarbon groups.

$R^{21}$ in $X^3$ in Formula (3) represents a C2-C10 alkylene group or an alkylarylene group. In particular, $R^{21}$ is preferably a branched or unbranched C2-C8 alkylene group, more preferably a branched or unbranched C2-C6 alkylene group, still more preferably a branched or unbranched C2-C4 alkylene group, and particularly preferably a branched or unbranched C3 alkylene group. Preferred examples of $R^{21}$ include alkylene groups with such numbers of carbons and specifically include an ethylene group, a propylene group, an isopropylene group, a butylene group, an isobutylene group, a pentylene group, a hexylene group, a heptylene group, an octylene group, a nonylene group, and a decylene group. Among these groups, an ethylene group, a propylene group, an isopropylene group, a butylene group, and an isobutylene group are particularly preferred, and a propylene group and an isopropylene group are most preferred.

$R^{22}$ in $X^3$ in Formula (3) represents a hydrogen atom or a methyl group, and is particularly preferably a hydrogen atom.

$R^{23}$ in $X^3$ in Formula (3) represents a C1-C10 alkoxy group or an aryloxy group. In particular, $R^{23}$ is preferably a branched or unbranched C1-C8 alkoxy group, more preferably a branched or unbranched C1-C6 alkoxy group, and still more preferably a branched or unbranched C1-C4 alkoxy group. Preferred examples of $R^{23}$ include alkoxy groups with such numbers of carbons and specifically include a methoxy group, an ethoxy group, a propoxy group, an isopropoxy group, a butoxy group, an isobutoxy group, a pentyloxy group, a hexyloxy group, a heptyloxy group, and an octyloxy group. Among these groups, a methoxy group, an ethoxy group, a propoxy group, and a butoxy group are particularly preferred, and a methoxy group is most preferred.

In Formula (3), t in $X^3$ is an integer of 2 to 20, and is particularly preferably an integer of 2 to 8.

The compound represented by Formula (3) may suitably be a compound represented by Formula (4) below, from the standpoint of improving the above-described properties well.

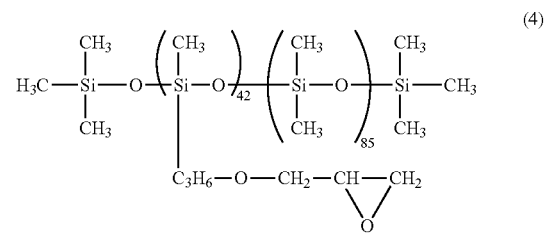

(4)

The modification of styrene-butadiene rubber with the compound (modifier) represented by Formula (2) or the compound (modifier) represented by Formula (3) can be carried out by conventionally known methods, such as by contacting styrene-butadiene rubber with the compound. Specifically, for example, after solution-polymerized styrene-butadiene rubber is prepared, a predetermined amount of compound is added to the rubber solution to allow the polymerizing end (active end) of the styrene-butadiene rubber to react with the compound.

The amount of the first styrene-butadiene rubber based on 100% by mass of the rubber component is 20 to 60% by mass. When the amount of the first styrene-butadiene rubber falls within this range, wet grip performance can be improved without deteriorating fuel economy. The amount of the first styrene-butadiene rubber is preferably 25% by mass or more, more preferably 30% by mass or more, and still more preferably 35% by mass or more. The amount of the first styrene-butadiene rubber is also preferably 55% by mass or less, and more preferably 50% by mass or less.

The amount of the second styrene-butadiene rubber based on 100% by mass of the rubber component is 10 to 30% by mass. When the amount of the second styrene-butadiene rubber falls within this range, fuel economy can be improved without deteriorating wet grip performance. The amount of the second styrene-butadiene rubber is preferably 15% by mass or more, and more preferably 20% by mass or more. The amount of the second styrene-butadiene rubber is also preferably 25% by mass or less.

Moreover, the combined amount of the first styrene-butadiene rubber and the second styrene-butadiene rubber based on 100% by mass of the rubber component is 30 to 80% by mass. When the combined amount falls within this range, excellent processability and excellent grip performance can be obtained, allowing the effect of the present invention to be sufficiently achieved. The combined amount is preferably 35% by mass or more, more preferably 40% by mass or more, and still more preferably 50% by mass or more. The combined amount is also preferably 75% by mass or less, and more preferably 70% by mass or less.

The polybutadiene rubber may be any polybutadiene rubber typically used in the tire industry, including, for example, polybutadiene rubbers with high cis content (high-cis BRs) such as BR1220 available from Zeon Corp., BR130B and BR150B available from Ube Industries, Ltd., and BR51, T700, and BR730 available from JSR Corp.; polybutadiene rubbers with syndiotactic polybutadiene crystals such as VCR412 and VCR617 available from Ube Industries, Ltd.; and polybutadiene rubbers (rare earth-catalyzed BRs) synthesized using rare-earth element catalysts.

The polybutadiene rubber preferably has a vinyl content of 20 mol % or less, and more preferably 15 mol % or less. The lower limit of the vinyl content is not limited to particular values, and may be 0 mol %. When the vinyl content falls within the range mentioned above, the effect of the present invention can be sufficiently achieved.

Moreover, the polybutadiene rubber preferably has a weight average molecular weight (Mw) of 300,000 or more, and more preferably 400,000 or more, while the upper limit of the Mw is not limited to particular values, but is preferably 1,000,000 or less, more preferably 900,000 or less, and still more preferably 600,000 or less. When the Mw falls within the range mentioned above, the effect of the present invention can be sufficiently achieved.

In the Description, the vinyl content (the amount of 1,2-butadiene units) in styrene-butadiene rubbers and polybutadiene rubbers, and the styrene content in styrene-butadiene rubbers are determined by $^1$H-NMR. The weight average molecular weight (Mw) of styrene-butadiene rubbers and polybutadiene rubbers can be determined by the method specified in the section of EXAMPLES.

In the polybutadiene rubber, the backbone and/or chain end may be modified with a modifier. For example, the polybutadiene rubber may be modified with a multifunctional modifier such as tin tetrachloride or silicon tetrachloride to form a partially branched structure. Particularly preferably, the backbone and/or chain end, more preferably the chain end, of the polybutadiene rubber are/is modified with a modifier containing a functional group that interacts with silica. The modified polybutadiene rubber that has been modified with such a modifier to contain a functional group that interacts with silica can be used to achieve excellent fuel economy. Thus, in another suitable embodiment of the present invention, the polybutadiene rubber is a modified polybutadiene rubber containing a functional group that interacts with silica.

The polybutadiene rubber modified with a modifier containing a functional group that interacts with silica may be one obtained by replacing, by a polybutadiene rubber skeleton structure, the styrene-butadiene rubber skeleton structure of the styrene-butadiene rubber modified with a modifier containing a functional group that interacts with silica described above. In particular, the modified polybutadiene rubber containing a functional group that interacts with silica is preferably a polybutadiene rubber (S-modified BR) modified with a compound (modifier) represented by Formula (2) above. Examples of the S-modified BR include those disclosed in JP 2010-111753 A (which is herein incorporated by reference in its entirety) and the like.

The modification of polybutadiene rubber with the compound (modifier) represented by Formula (2) can be carried out by conventionally known methods, such as those disclosed in JP H6-53768 B and JP H6-57767 B (which are herein incorporated by reference in their entirety). For example, the modification can be carried out by contacting polybutadiene rubber with the compound. Specifically, for example, after polybutadiene rubber is prepared by anion polymerization using a polymerization initiator such as a lithium compound, a predetermined amount of compound is added to the rubber solution to allow the polymerizing end (active end) of the polybutadiene rubber to react with the compound.

The amount of the polybutadiene rubber based on 100% by mass of the rubber component is 5 to 30% by mass. When the amount of the polybutadiene rubber falls within this range, excellent abrasion resistance can be obtained. The amount of the polybutadiene rubber is preferably 10% by mass or more, and more preferably 15% by mass or more. The amount of the polybutadiene rubber is also preferably 25% by mass or less, and more preferably 20% by mass or less.

The rubber component may further include other rubber materials in addition to the natural rubber, first styrene-butadiene rubber, second styrene-butadiene rubber, and polybutadiene rubber.

Examples of other rubber materials include polyisoprene rubber (IR), 3,4-polyisoprene rubber (3,4-IR), styrene-butadiene rubber other than the first and second styrene-butadiene rubbers, styrene-isoprene-butadiene rubber (SIBR), chloroprene rubber (CR), acrylonitrile-butadiene rubber (NBR), ethylene-propylene-diene rubber (EPDM), butyl rubber (IIR), and halogenated butyl rubber (X-IIR).

The unvulcanized rubber composition in the present invention contains at least one filler including silica. Examples of the filler include, in addition to silica, carbon black, calcium carbonate, talc, alumina, clay, aluminum hydroxide, mica, and others typically used as filler in the tire industry. In particular, when a combination of silica and carbon black is used as filler, the effect of the present invention can be more suitably achieved.

The amount of the filler (i.e., the total amount of substances that can be classified as filler such as silica and carbon black) is 60 parts by mass or more per 100 parts by mass of the rubber component. If the amount of the filler is less than 60 parts by mass, breaking properties may be impaired, abrasion resistance may be poor, and wet grip performance may be lowered. The amount of the filler is preferably 90 parts by mass or less, more preferably 85 parts by mass or less, and still more preferably 80 parts by mass or less per 100 parts by mass of the rubber component. If the amount of the filler is more than 90 parts by mass, fuel economy may be poor.

The unvulcanized rubber composition in the present invention contains silica as filler, and the inclusion of silica provides excellent fuel economy and excellent wet grip performance. The amount of the silica per 100 parts by mass of the rubber component is preferably 55 parts by mass or more. When the amount of the silica falls within this range, better wet grip performance and better breaking properties can be obtained. Thus, in another suitable embodiment of the present invention, the filler includes at least 55 parts by mass of silica per 100 parts by mass or the rubber component. The amount of the silica per 100 parts by mass or the rubber component is preferably 90 parts by mass or less, more preferably 85 parts by mass or less, and still more preferably 80 parts by mass or less.

The silica may be any silica, such as dry silica (anhydrous silica), wet silica (hydrous silica), colloidal silica, precipitated silica, calcium silicate, and aluminum silicate. Wet silica is preferred because it contains many silanol groups. Specific examples of the silica include Ultrasil VN3 and Ultrasil VN3-G available from Evonik Degussa; VN3, AQ, ER, and RS-150 available from Tosoh Silica Corp.; and Zeosil 1115MP and Zeosil 1165MP available from Rhodia.

The silica may be used alone or in combinations of two or more.

The silica preferably has a nitrogen adsorption specific surface area ($N_2SA$) of 50 $m^2/g$ or more. If it is less than 50 $m^2/g$, the silica provides a small reinforcing effect, which tends to result in lower abrasion resistance, lower breaking properties, and lower wet grip performance. In terms of breaking properties and wet grip performance, the $N_2SA$ is more preferably 100 $m^2/g$ or more, and still more preferably 150 $m^2/g$ or more. The nitrogen adsorption specific surface area ($N_2SA$) of the silica is also preferably 250 $m^2/g$ or less, and more preferably 200 $m^2/g$ or less. If the $N_2SA$ is more than 250 m²/g, the silica is difficult to disperse, which tends to result in deteriorated fuel economy and deteriorated processability.

The nitrogen adsorption specific surface area of silica is determined by a BET method in accordance with ASTM D3037-93.

Examples of the carbon black include furnace black, acetylene black, thermal black, channel black, and graphite. Specific examples include channel carbon black such as EPC, MPC, and CC; furnace carbon black such as SAF, ISAF, HAF, MAF, FEF, SRF, GPF, APF, FF, CF, SCF, and ECF; thermal carbon black such as FT and MT; and acetylene carbon black.

The carbon black may be used alone or in combinations of two or more.

The carbon black preferably has a nitrogen adsorption specific surface area ($N_2SA$) of 5 to 200 m²/g. The lower limit is more preferably 50 m²/g, still more preferably 80 m²/g, and particularly preferably 85 m²/g, while the upper limit is more preferably 150 m²/g, still more preferably 130 m²/g, and particularly preferably 120 m²/g. Moreover, the carbon black preferably has a dibutyl phthalate (DBP) absorption of 5 to 300 ml/100 g. The lower limit is more preferably 80 ml/100 g, still more preferably 100 ml/100 g, and particularly preferably 110 ml/100 g, while the upper limit is more preferably 180 ml/100 g, and still more preferably 140 ml/100 g. If the $N_2SA$ or DBP absorption of the carbon black is less than the lower limit of the range mentioned above, the carbon black provides a small reinforcing effect, which tends to result in lower abrasion resistance and lower breaking properties. Also, if the $N_2SA$ or DBP absorption is more than the upper limit of the range, the carbon black has poor dispersibility, which tends to result in increased hysteresis loss and reduced fuel economy and may provide deteriorated processability.

The nitrogen adsorption specific surface area of carbon black is determined in accordance with ASTM D4820-93. The DBP absorption is determined in accordance with ASTM D2414-93.

Commercially available carbon blacks include Diablack N339 and Diablack I available from Mitsubishi Chemical Corp., Seast 6, Seast 7HM, and Seast KH available from Tokai Carbon Co., Ltd., and CK3 and Special Black 4A available from Evonik Degussa.

If the unvulcanized rubber composition in the present invention contains carbon black as filler, the amount of carbon black per 100 parts by mass of the rubber component is preferably 1 part by mass or more, and more preferably 3 parts by mass or more. If the amount is less than 1 part by mass, sufficient reinforcement may not be obtained. The amount is also preferably 90 parts by mass or less, more preferably 85 parts by mass or less, still more preferably 60 parts by mass or less, further preferably 30 parts by mass or less, and particularly preferably 15 parts by mass or less. If the amount is more than 90 parts by mass, fuel economy tends to be deteriorated.

The unvulcanized rubber composition in the present invention contains a silane coupling agent represented by Formula (1) below. The inclusion of such a silane coupling agent enables excellent fuel economy and excellent breaking properties to be achieved.

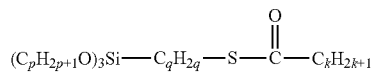

(1)

In Formula (1), p is an integer of 1 to 3, q is an integer of 1 to 5, and k is an integer of 5 to 12.

In Formula (1), p is an integer of 1 to 3 and preferably 2. If p is 4 or greater, the coupling reaction tends to be delayed.

In Formula (1), q is an integer of 1 to 5, and is preferably 2 to 4, and more preferably 3. If q is 0 or 6 or greater, the synthesis of such a silane coupling agent is difficult.

In Formula (1), k is an integer of 5 to 12, and is preferably 5 to 10, more preferably 6 to 8, and still more preferably 7.

Examples of the silane coupling agent represented by Formula (1) include NXT (3-octanoylthio-1-propyltriethoxysilane) available from Momentive Performance Materials. The silane coupling agent represented by Formula (1) may be used alone or in combinations of two or more.

The amount of the silane coupling agent represented by Formula (1) is 0.5 to 20 parts by mass per 100 parts by mass of silica. If the amount is less than 0.5 parts by mass, it is difficult to sufficiently disperse silica, which tends to result in deteriorated fuel economy and deteriorated breaking properties. Also, the addition of more than 20 parts by mass of the silane coupling agent has no further effect on improving silica dispersibility and tends to unnecessarily increase the cost. Further, such an addition reduces scorch time, which tends to result in deteriorated processability in kneading and extrusion. The amount of the silane coupling agent is preferably 1.5 parts by mass or more, and more preferably 2.5 parts by mass or more per 100 parts by mass of silica, while it is preferably 15 parts by mass or less, and more preferably 10 parts by mass or less per 100 parts by mass of silica.

The unvulcanized rubber composition in the present invention may contain other silane coupling agents in addition to the silane coupling agent represented by Formula (1).

Examples of other silane coupling agents include commonly used silane coupling agents, including, for example, sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropylmethacrylatemonosulfide, and 3-trimethoxysilylpropylmethacrylatemonosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. They are commercially available under the trade names Si69, Si75, and Si363 from Evonik Degussa; and NXT-LV, NXTULV, and NXT-Z from Momentive Performance Materials.

The unvulcanized rubber composition in the present invention may contain, in addition to the above components, additives conventionally used in the rubber industry, e.g., plasticizers such as extender oil (oil) and liquid resin; vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides such as dicumyl peroxide and ditertiary butyl peroxide; processing aids; antioxidants; wax; and lubricants.

The unvulcanized rubber composition in the present invention preferably contains a plasticizer such as oil or liquid resin from the standpoint of processability. In particular, it is preferred that the unvulcanized rubber composition contain an oil as a plasticizer. This allows adjustment of the hardness to appropriately low values, thereby providing good processability, good wet grip performance, and good breaking properties.

The oil may be any conventional known oil, including, for example, process oils such as paraffinic process oils, aromatic process oils, and naphthenic process oils; low PCA (polycyclic aromatic) process oils such as TDAE and MES; vegetable fats and oils; and mixtures thereof. From the standpoint of abrasion resistance and breaking properties, aromatic process oils are preferred among these. Specific examples of the aromatic process oils include Diana Process Oil AH series available from Idemitsu Kosan Co., Ltd.

From the environmental standpoint, the oil preferably has a polycyclic aromatic content (PCA) of less than 3% by mass, and more preferably less than 1% by mass. The polycyclic aromatic content (PCA) is determined in accordance with the Institute of Petroleum (IP, U.K.) 346/92 method.

The unvulcanized rubber composition may further contain a liquid resin as a plasticizer. The inclusion of a liquid resin as a plasticizer leads to better fuel economy, better breaking properties, and better wet grip performance.

The liquid resin may be any liquid resin, such as aromatic vinyl polymers, coumarone-indene resins, indene resins, terpene resins, and rosin resins. These may be used alone or in combinations of two or more. Among these resins, aromatic vinyl polymers, coumarone-indene resins, terpene resins, rosin resins, and derivatives thereof are preferred, and coumarone-indene resins are more preferred, from the standpoints of tackiness before vulcanization, fuel economy, and breaking properties.

The aromatic vinyl polymer means a resin obtained by polymerizing α-methylstyrene and/or styrene. Examples include a homopolymer of styrene, a homopolymer of α-methylstyrene, and copolymers of α-methylstyrene and styrene.

The coumarone-indene resin means a resin in which the skeleton (backbone) mainly consists of coumarone and indene monomer components. The skeleton may include, in addition to coumarone and indene monomer components, other monomer components such as styrene, α-methylstyrene, methylindene, and vinyltoluene.

The indene resin means a resin in which the skeleton (backbone) mainly consists of indene monomer components.

The terpene resin means a terpene-based resin typified by a resin obtained by polymerizing a terpene compound such as α-pinene, β-pinene, camphene or dipentene, or a terpenephenol resin which is made from a terpene compound and a phenol compound.

The rosin resin means a rosin-based resin typified by a natural rosin, polymerized rosin, modified rosin, or ester compound thereof, or hydrogenated product thereof.

The liquid resin preferably has a softening point of −40° C. or higher, more preferably −20° C. or higher, still more preferably −10° C. or higher, and particularly preferably 0° C. or higher. The softening point is also preferably 45° C. or lower, more preferably 40° C. or lower, and still more preferably 35° C. or lower. When the softening point of the liquid resin falls within the range mentioned above, the effects of improving wet grip performance and breaking properties can be more suitably achieved.

In the Description, the softening point is determined as set forth in JIS K 6220-1:2001 with a ring and ball softening point measuring apparatus and is defined as the temperature at which the ball drops down.

In particular, the plasticizer is preferably a combination of the oil and the liquid resin. The combined use of the oil and the liquid resin as the plasticizer allows the effects of improving wet grip performance and breaking properties to be more suitably achieved.

If the unvulcanized rubber composition in the present invention contains a plasticizer, the amount of the plasticizer per 100 parts by mass of the rubber component is preferably 3 parts by mass or more, more preferably 5 parts by mass or more, and still more preferably 10 parts by mass or more, while preferably 50 parts by mass or less, more preferably 40 parts by mass or less, and still more preferably 30 parts by mass or less. When the amount falls within the range mentioned above, the effect of the present invention can be more suitably achieved.

If the plasticizer is a combination of the oil and the liquid resin, the mixture ratio of the oil to the liquid resin, represented by oil:liquid resin, is preferably 1:0.1 to 1:10, and more preferably 1:0.5 to 1:2. When the mixture ratio of the oil to the liquid resin falls within the range mentioned above, the effect of the present invention can be more suitably achieved.

The zinc oxide may be any zinc oxide. Examples include zinc oxide conventionally used in the rubber industry, such as Ginrei R available from Toho Zinc Co., Ltd. and zinc oxide available from Mitsui Mining & Smelting Co., Ltd; and finely divided zinc oxide with an average particle size of 200 nm or smaller such as ZINCOX SUPER F-2 produced by HakusuiTech Co., Ltd.

The amount of the zinc oxide per 100 parts by mass of the rubber component is preferably 1.0 part by mass or more, and more preferably 2.0 parts by mass or more. If the amount is less than 1.0 part by mass, the hardness (Hs) may be insufficient due to reversion. The amount of the zinc oxide per 100 parts by mass of the rubber component is also preferably 3.7 parts by mass or less, and more preferably 3.0 parts by mass or less. If the amount is more than 3.7 parts by mass, breaking properties tend to decrease.

The unvulcanized rubber composition in the present invention can be prepared by kneading the above-described components with a Banbury mixer, a kneader, an open roll mill, or the like. Then, the vulcanized rubber composition in the present invention can be prepared by vulcanizing the unvulcanized rubber composition. Thus, the vulcanized rubber composition in the present invention can be prepared by usual methods.

The tire of the present invention, which includes a tire component formed of the vulcanized rubber composition obtained by vulcanizing the unvulcanized rubber composition in the present invention, has good wet grip performance and good breaking properties while ensuring fuel economy.

The fuel economy of the vulcanized rubber composition can be evaluated by determining the loss tangent (tan δ) of the vulcanized rubber composition at 70° C. by viscoelastic measurement.

A smaller tan δ at 70° C. indicates better fuel economy. The tan δ at 70° C. of the vulcanized rubber composition is preferably 0.10 or smaller. A tan δ at 70° C. of 0.10 or smaller indicates sufficiently good fuel economy. The tan δ at 70° C. of the vulcanized rubber composition is more preferably 0.09 or smaller. The lower limit is not limited to particular values.

Moreover, the wet grip performance of the vulcanized rubber composition can be evaluated by determining the tan δ of the vulcanized rubber composition at 0° C. by viscoelastic measurement.

A greater tan δ at 0° C. indicates better wet grip performance. The tan δ at 0° C. of the vulcanized rubber composition is preferably 0.50 or greater. A tan δ at 0° C. of 0.50 or greater indicates sufficiently good wet grip performance. The tan δ at 0° C. of the vulcanized rubber composition is more preferably 0.55 or greater. The upper limit is not limited to particular values.

The viscoelastic measurement may be carried out using a viscoelastic spectrometer VES (available from Iwamoto Seisakusho Co., Ltd.) at a frequency of 10 Hz, an initial strain of 10%, and a dynamic strain of 2%.

Moreover, the breaking properties of the vulcanized rubber composition can be evaluated by determining the elongation at break (EB) and the tensile strength at break (TB) of the vulcanized rubber composition at 30° C. and 80° C. in tensile testing.

A greater ratio of EB to TB (EB/TB) at 30° C. indicates better breaking properties at the initial stage of driving. The ratio of EB to TB (EB/TB) at 30° C. of the vulcanized rubber composition is preferably 15 or more. An EB/TB ratio at 30° C. of 15 or more indicates sufficiently good breaking properties. If the EB/TB ratio is less than 15, the rubber composition has poor breaking properties, which may cause rubber chipping. The EB/TB ratio at 30° C. of the vulcanized rubber composition is more preferably 18 or more, still more preferably 20 or more, and particularly preferably 25 or more. The upper limit is not limited to particular values.

Moreover, a greater ratio of EB to TB (EB/TB) at 80° C. indicates better breaking properties at elevated tire temperatures resulting from driving for a long period of time. The ratio of EB to TB (EB/TB) at 80° C. of the vulcanized rubber composition is preferably 30 or more. An EB/TB ratio at 80° C. of 30 or more indicates sufficiently good breaking properties. If the EB/TB ratio is less than 30, the rubber composition has poor breaking properties at elevated tire temperatures and thus driving for a long period of time may cause rubber chipping. The EB/TB ratio at 80° C. of the vulcanized rubber composition is more preferably 35 or more, and still more preferably 38 or more. The upper limit is not limited to particular values.

Accordingly, when the EB/TB ratio at 30° C. and the EB/TB ratio at 80° C. fall within the respective ranges mentioned above, excellent breaking properties can be stably achieved under any conditions ranging from the initial stage of driving to the elevated tire temperatures resulting from driving for a long period of time.

The tensile testing may be carried out in accordance with JIS K 6251 "Rubber, vulcanized or thermoplastic—Determination of tensile stress-strain properties" using No. 3 dumbbell specimens.

In another suitable embodiment of the present invention, as described above, the vulcanized rubber composition has vulcanized rubber properties including: a tan δ at 0° C. of 0.50 or greater and a tan δ at 70° C. of 0.10 or smaller, as determined by viscoelastic measurement at an initial strain of 10% and a dynamic strain of 2%; and a ratio (EB/TB) of elongation at break (EB) to tensile strength at break (TB) at 30° C. of 15 or greater, as determined in accordance with JIS K 6251.

In yet another suitable embodiment of the present invention, the vulcanized rubber composition has vulcanized rubber properties including a ratio (EB/TB) of elongation at break (EB) to tensile strength at break (TB) at 80° C. of 30 or greater, as determined in accordance with JIS K 6251.

The vulcanized rubber composition in the present invention can be used in various tire components such as a cap tread, a base tread, an undertread, a clinch apex, a bead apex, a sidewall, a breaker cushion rubber, a carcass cord topping rubber, a runflat reinforcing layer, an insulation, a chafer, and an innerliner. Among these, it can be suitably used in a tread and especially in a cap tread. Thus, in another suitable embodiment of the present invention, in the tire including a tire component formed of the vulcanized rubber composition in the present invention, the tire component is a tread.

The tire of the present invention can be produced by a usual method using the vulcanized rubber composition obtained by vulcanizing the unvulcanized rubber composition. Specifically, the unvulcanized rubber composition including the above-described components is extruded and processed into the shape of a tire component (e.g. a tread), and then formed with other tire components on a tire building machine by a usual method to build an unvulcanized tire, which is then heated and pressurized in a vulcanizer, whereby the tire of the present invention can be produced.

The tire of the present invention may either be a pneumatic tire or an airless (solid) tire, but is preferably a pneumatic tire. The tire of the present invention can also be suitably used as a tire for passenger cars, a tire for trucks and buses, a tire for two-wheelers, a racing tire, and the like. In particular, it can be suitably used as a tire for passenger cars and especially as a tire for light automobiles with a displacement of 660 cc or less.

EXAMPLES

The present invention will be described in greater detail by reference to, but not limited to, examples.

The physical properties of the polymers prepared below were determined as follows.
[Weight Average Molecular Weight (Mw)]
Weight average molecular weight (Mw) was determined by gel permeation chromatography (GPC) under the following conditions (1) to (8).
(1) Device: GPC-8000 series available from Tosoh Corp.
(2) Separation column: TSKgel SuperMultipore HZ-M available from Tosoh Corp.
(3) Measurement temperature: 40° C.
(4) Carrier: tetrahydrofuran (5) Flow rate: 0.6 mL/min
(6) Injected amount: 5 µL
(7) Detector: differential refractometer
(8) Molecular weight standards: polystyrene standards

[Vinyl Content and Styrene Content]

Vinyl content and styrene content were determined using a NMR device of JNM-ECA series available from JEOL Ltd.

<Preparation of Chain End Modifier>

In a nitrogen atmosphere, a 100-ml measuring flask was charged with 23.6 g of 3-(N,N-dimethylamino) propyltrimethoxysilane (3-dimethylaminopropyltrimethoxysilane) (available from AZmax Co., Ltd.). Then, anhydrous hexane (available from Kanto Chemical Co., Inc.) was added to give a total volume of 100 ml.

<Preparation Example 1 (SBR)>

An autoclave with a stirrer was charged with 6,000 g of cyclohexane, 150 g of styrene, 450 g of 1,3-butadiene, and tetramethylethylenediamine in an amount of 1.5 times the molar amount of n-butyllithium to be used. Thereafter, 9.5 mmol of n-butyllithium was added and the polymerization was started at 50° C. Twenty minutes after the start of the polymerization, a mixture of 60 g of styrene and 340 g of 1,3-butadiene was continuously added over 60 minutes. The maximum temperature during the polymerization reaction was 70° C.

After the completion of the continuous addition, the polymerization reaction was continued for additional 40 minutes. After confirming that the polymerization conversion reached 100%, a small amount of polymerization solution was sampled. The sampled small amount of polymerization solution was mixed with excess methanol so that the reaction was terminated, followed by air drying to yield a polymer. This polymer was used as a sample for gel permeation chromatographic analysis.

Immediately after the sampling of the small amount of polymerization solution, a polyorganosiloxane A (compound represented by Formula (4) below, which can be synthesized by the method described in The Chemical Society of Japan Ed., *Jikken Kagaku Koza* (Encyclopedia of Experimental Chemistry), 4th Ed., vol. 28, and references therein, each of which is herein incorporated by reference in its entirety.) in an amount of 0.03 times the molar amount of n-butyllithium used was added in the form of a 10% solution in toluene, followed by a reaction for 30 minutes. To the mixture then was added methanol as a polymerization terminator in an amount of twice the molar amount of n-butyllithium used. Thus, a polymerization solution containing a conjugated diene rubber I was obtained. To the polymerization solution was added 0.2 parts by mass of the antioxidant Irganox 1520 (available from Ciba-Geigy) per 100 parts by mass of the rubber component. The polymerization solvent was then removed by steam stripping, followed by vacuum drying at 60° C. for 24 hours. Thus, a solid SBR 1 was obtained. The SBR 1 had a styrene content of 42% by mass, an Mw of about 1,000,000, and a vinyl content of 32 mol %.

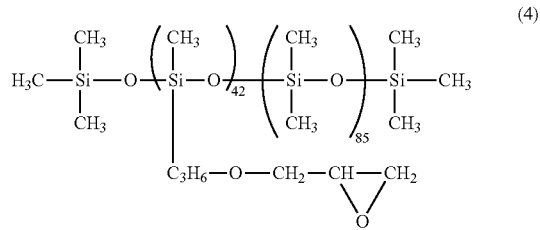

(4)

<Preparation Example 2 (Modified SBR)>

A 30-L pressure-resistant vessel was sufficiently purged with nitrogen and charged with 18 L of n-hexane, 540 g of styrene (available from Kanto Chemical Co., Inc.), 1460 g of butadiene, and 17 mmol of tetramethylethylenediamine, and the temperature was raised to 40° C. Next, 10.5 mL of butyllithium was added. The temperature was then raised to 50° C., and the mixture was stirred for 3 hours. Subsequently, 3.5 mL of a 0.4 mol/L silicon tetrachloride solution in hexane was added, and the mixture was stirred for 30 minutes. Then, 30 mL of the chain end modifier prepared above was added, and the mixture was stirred for 30 minutes. After 2 mL of methanol (available from Kanto Chemical Co., Inc.) containing 0.2 g of 2,6-tert-butyl-p-cresol (Ouchi Shinko Chemical Industrial Co., Ltd.) dissolved therein was added to the reaction solution, the reaction solution was put in a stainless steel container containing 18 L of methanol, and then a coagulum was recovered. The coagulum was dried under reduced pressure for 24 hours to obtain a modified SBR 2. The modified SBR 2 had a styrene content of 28% by mass, an Mw of 717,000, and a vinyl content of 60 mol %.

<Preparation Example 3 (Modified BR)>

A 30-L pressure-resistant vessel was sufficiently purged with nitrogen and charged with 18 L of n-hexane, 2,000 g of butadiene, and 2 mmol of tetramethylethylenediamine (TMEDA), and the temperature was raised to 60° C. Next, 10.3 mL of butyllithium was added. The temperature was then raised to 50° C., and the mixture was stirred for 3 hours. Then, 11.5 mL of the chain end modifier prepared above was added, and the mixture was stirred for 30 minutes. After 15 mL of methanol and 0.1 g of 2,6-tert-butyl-p-cresol were added to the reaction solution, the reaction solution was put in a stainless steel container containing 18 L of methanol, and then a coagulum was recovered. The coagulum was dried under reduced pressure for 24 hours to obtain a modified BR. Analysis showed that the modified BR had an Mw of 430,000 and a vinyl content of 12 mol %.

The chemicals used in examples and comparative examples are listed below.

NR: TSR20
SBR 1: SBR 1 prepared in Preparation Example 1
SBR 2: modified SBR 2 prepared in Preparation Example 2
SBR 3: SBR 1502 (available from Zeon Corp., styrene content: 23.5% by mass)
BR: modified BR prepared in Preparation Example 3
Silica: Ultrasil VN3 ($N_2SA$: 175 $m^2/g$) available from Evonik Degussa
Silane coupling agent 1: NXT (3-octanoylthio-1-propyltriethoxysilane) available from Momentive Performance Materials
Silane coupling agent 2: Si69 (bis(3-triethoxysilylpropyl) tetrasulfide) available from Evonik Degussa
Carbon black: Diablack I ($N_2SA$: 114 $m^2/g$, average primary particle size: 22 nm) available from Mitsubishi Chemical Corp.
Plasticizer 1: NOVARES C10 (liquid coumarone-indene resin, softening point: 5° C. to 15° C.) available from Rutgers Chemicals
Plasticizer 2: Diana process oil AH-24 available from Idemitsu Kosan Co., Ltd.
Antioxidant: NOCRAC 6C (N-phenyl-N'-(1,3-dimethylbutyl)-p-phenylenediamine) available from Ouchi Shinko Chemical Industrial Co., Ltd.
Stearic acid: stearic acid "TSUBAKI" available from NOF Corp.

Zinc oxide: zinc oxide #3 available from HakusuiTech Co., Ltd.
Wax: OZOACE 0355 available from Nippon Seiro Co., Ltd.
Sulfur: powdered sulfur available from Tsurumi Chemical Industry Co., Ltd.
Vulcanization accelerator 1: NOCCELER NS (N-t-butyl-2-benzothiazyl sulfenamide) available from Ouchi Shinko Chemical Industrial Co., Ltd.
Vulcanization accelerator 2: NOCCELER D (N,N'-diphenylguanidine) available from Ouchi Shinko Chemical Industrial Co., Ltd.

EXAMPLES AND COMPARATIVE EXAMPLES

According to the formulation shown in Table 1, materials other than sulfur and vulcanization accelerators were kneaded using a 1.7-L Banbury mixer at 150° C. for 5 minutes to provide a kneaded mixture. Then, the sulfur and vulcanization accelerators were added to the kneaded mixture, and they were kneaded with an open two roll mill at 80° C. for 5 minutes to obtain an unvulcanized rubber composition.

The unvulcanized rubber composition was vulcanized at 150° C. for 30 minutes to prepare a vulcanized rubber composition.

The unvulcanized rubber composition was also extrusion-molded into the shape of a cap tread, and assembled with other tire components on a tire building machine to build an unvulcanized tire, which was then press-vulcanized at 170° C. for 10 minutes to prepare a test tire (tire size: 195/65R15, a tire for light automobiles).

The vulcanized rubber compositions and test tires thus obtained were subjected to the following evaluations. The evaluation results are shown in Table 1.
(Viscoelastic Measurement)

The loss tangent (tan δ) of the vulcanized rubber compositions was determined using a viscoelastic spectrometer VES (available from Iwamoto Seisakusho Co., Ltd.) at a temperature of 70° C. and 0° C., a frequency of 10 Hz, an initial strain of 10%, and a dynamic strain of 2%.

A smaller tan δ at 70° C. indicates a smaller rolling resistance and better fuel economy, while a greater tan δ at 0° C. indicates better wet grip performance.
(Tensile Testing)

Tensile testing in different directions relative to the direction of rolling extrusion was performed at 30° C. and 80° C. in accordance with JIS K 6251 "Rubber, vulcanized or thermoplastic—Determination of tensile stress-strain properties" using No. 3 dumbbell specimens made from the vulcanized rubber compositions. Thus, the elongation at break (EB) and tensile strength at break (TB) of the vulcanized rubber compositions were determined and the ratio (EB/TB) of EB to TB was calculated. The determination was based on the assumption that the circumferential direction of a tire corresponds to the extrusion direction of the roll, the width direction thereof corresponds to the width direction of the roll, and the vertical direction thereof corresponds to the thickness direction of the specimen.

A greater ratio (EB/TB) of EB to TB at 30° C. indicates better breaking properties at the initial stage of driving, while a greater ratio (EB/TB) of EB to TB at 80° C. indicates better breaking properties at elevated tire temperatures resulting from driving for a long period of time.
(Fuel Economy)

The rolling resistance of the test tires was determined by running the test tires on a rolling resistance tester with a rim (15×6 JJ) at an internal pressure of 230 kPa, a load of 3.43 kN, and a speed of 80 km/h. The results are expressed as an index, with the value in Comparative Example 3 set equal to 100. A higher index indicates better fuel economy.
(Chipping Resistance)

After driving about 30,000 km on rough roads, mainly at a quarry and the like, the number of cuts and chippings on the tread surface per unit area was counted. The results are expressed as an index, with the value in Comparative Example 3 set equal to 100. A higher index indicates better chipping resistance (breaking properties).
(Wet Grip Performance)

The test tires were mounted on each wheel of a car (a front-engine, front-wheel-drive car, 660 cc, made in Japan). The car's braking distance from an initial speed of 100 km/h was measured on a wet asphalt road. The results are expressed as an index. A higher index indicates better wet-skid performance (wet grip performance). The index was determined using the following equation.

(Wet-skid performance)=(Braking distance of Comparative Example 3)/(Braking distance of each formulation)×100

TABLE 1

| | | Examples | | Comparative Examples | | |
| --- | --- | --- | --- | --- | --- | --- |
| | | 1 | 2 | 1 | 2 | 3 |
| Formulation (Parts by mass) | NR | 15 | 15 | 15 | 15 | 15 |
| | SBR 1 | 45 | 45 | 45 | — | 45 |
| | SBR 2 | 25 | 25 | 25 | — | 25 |
| | SBR 3 | — | — | — | 70 | — |
| | BR | 15 | 15 | 15 | 15 | 15 |
| | Silica | 55 | 55 | 55 | 55 | 50 |
| | Silane coupling agent 1 | 5 | 5 | — | 5 | 5 |
| | Silane coupling agent 2 | — | — | 5 | — | — |
| | Carbon black | 5 | 5 | 5 | 5 | 5 |
| | Plasticizer 1 | — | 5 | — | — | — |
| | Plasticizer 2 | 10 | 5 | 10 | 10 | 10 |
| | Antioxidant | 2 | 2 | 2 | 2 | 2 |
| | Stearic acid | 2 | 2 | 2 | 2 | 2 |
| | Zinc oxide | 2 | 2 | 2 | 2 | 2 |
| | Wax | 2 | 2 | 2 | 2 | 2 |
| | Sulfur | 1.5 | 1.5 | 1.5 | 1.5 | 1.5 |
| | Vulcanization accelerator 1 | 1.5 | 1.5 | 1.5 | 1.5 | 1.5 |
| | Vulcanization accelerator 2 | 1 | 1 | 1 | 1 | 1 |
| Vulcanized rubber properties | Tan δ at 70° C. | 0.08 | 0.08 | 0.12 | 0.14 | 0.06 |
| | Tan δ at 0° C. | 0.55 | 0.55 | 0.55 | 0.48 | 0.48 |
| | EB/TB at 30° C. | 25 | 30 | 23 | 20 | 12 |
| | EB/TB at 80° C. | 32 | 40 | 30 | 27 | 25 |
| Tire properties | Fuel economy | 100 | 100 | 95 | 90 | 100 |
| | Chipping resistance | 120 | 125 | 110 | 105 | 100 |
| | Wet grip performance | 105 | 107 | 105 | 101 | 100 |

The results of Table 1 demonstrate that Examples 1 and 2, which used the above-described unvulcanized rubber composition containing a specific rubber component, at least one filler including silica, and a silane coupling agent represented by Formula (1) above in specific amounts, showed improved wet grip performance and improved breaking properties while ensuring fuel economy.

The invention claimed is:
1. A tire, comprising a tire component formed of a vulcanized rubber composition, the vulcanized rubber composition being obtained by vulcanizing an unvulcanized rubber composition, the unvulcanized rubber composition comprising a rubber component, at least one filler including silica, and a silane coupling agent, wherein
the rubber component comprises natural rubber, a first styrene-butadiene rubber that has a styrene content of 35% by mass or more, a second styrene-butadiene rubber that has a styrene content of 30% by mass or less, and polybutadiene rubber, an amount of the natural rubber based on 100% by mass of the rubber component being 5 to 30% by mass, an amount of the first styrene-butadiene rubber based on 100% by mass of the rubber component being 20 to 60% by mass, an amount of the second styrene-butadiene rubber based on 100% by mass of the rubber component being 10 to 30% by mass, an amount of the polybutadiene rubber based on 100% by mass of the rubber component being 5 to 30% by mass, and a combined amount of the first styrene-butadiene rubber and the second styrene-butadiene rubber based on 100% by mass of the rubber component being 30 to 80% by mass,
an amount of the filler per 100 parts by mass of the rubber component is 60 parts by mass or more, and
the silane coupling agent is a compound of Formula (1)

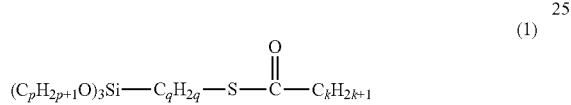

wherein p is an integer of 1 to 3, q is an integer of 1 to 5, and k is an integer of 5 to 12, and wherein an amount of the silane coupling agent per 100 parts by mass of the silica is 0.5 to 20 parts by mass.

2. The tire according to claim 1, wherein the filler includes at least 55 parts by mass of silica per 100 parts by mass of the rubber component.

3. The tire according to claim 1, wherein the polybutadiene rubber is a modified polybutadiene rubber containing a functional group that interacts with silica, the functional group being at least one member selected from the group consisting of an amino group, an amido group, an alkoxysilyl group, an isocyanate group, an imino group, an imidazole group, an urea group, an ether group, a carbonyl group, an oxycarbonyl group, a sulfide group, a disulfide group, a sulfonyl group, a sulfinyl group, a thiocarbonyl group, an ammonium group, an imido group, a hydrazo group, an azo group, a diazo group, a carboxy group, a nitrile group, a pyridyl group, an alkoxy group, a hydrocarbon group, a hydroxy group, an oxy group, and an epoxy group.

4. The tire according to claim 1, wherein the vulcanized rubber composition has vulcanized rubber properties comprising:
a tan δ at 0° C. of 0.50 or greater and a tan δ at 70° C. of 0.10 or smaller, as determined by viscoelastic measurement at an initial strain of 10% and a dynamic strain of 2%; and
a ratio (EB/TB) of elongation at break (EB) to tensile strength at break (TB) at 30° C. of 15 or greater, as determined in accordance with JIS K 6251.

5. The tire according to claim 1, wherein the vulcanized rubber composition has vulcanized rubber properties comprising a ratio (EB/TB) of elongation at break (EB) to tensile strength at break (TB) at 80° C. of 30 or greater, as determined in accordance with JIS K 6251.

6. The tire according to claim 1, wherein the tire component is a tread.

* * * * *